I. B. SIDDLE.
Corn Sheller.
No. 63,112. Patented March 19, 1867.
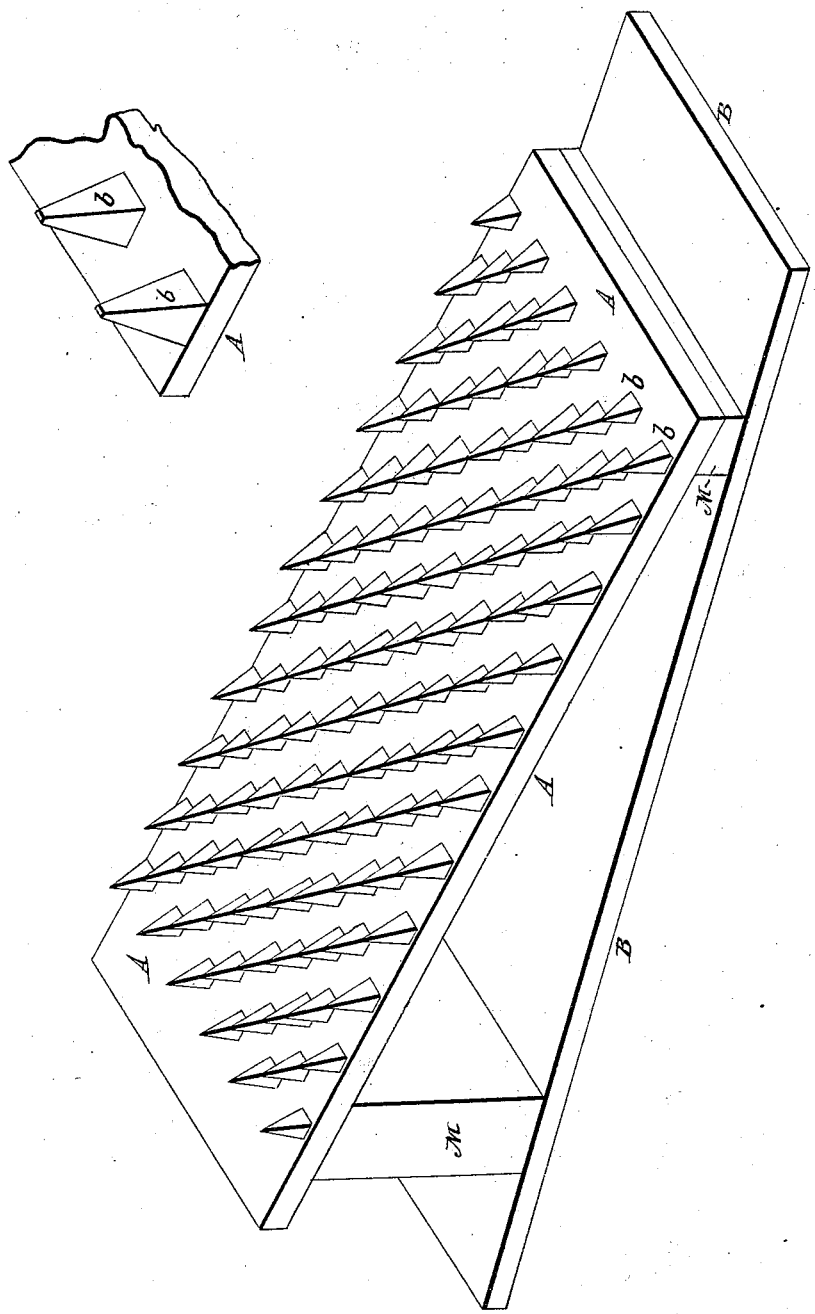
Witnesses:
B. S. Hudnik
Cha. D. Coombs
Inventor:
Isaac B. Siddle

United States Patent Office.

ISAAC B. SIDDLE, OF CASWELL COUNTY, NORTH CAROLINA.

*Letters Patent No. 63,112, dated March 19, 1867.*

IMPROVEMENT IN CORN SHELLERS.

*The Schedule referred to in these Letters Patent and making part of the same.*

TO ALL WHOM IT MAY CONCERN:

Be it known that I, ISAAC B. SIDDLE, of the county of Caswell, and State of North Carolina, have made a new and useful Improvement in Corn Shellers; and I hereby declare the following to be a full and exact description of the same, reference being had to the annexed drawing making a part of the specification.

The nature of my improvement consists in providing a more simple device for shelling corn, whereby the price of the machine is much reduced, and a single person may use it. The ordinary corn sheller contains gearing which makes it necessary to use either animal or other power to drive it, and to have a person to feed it. Therefore when used as a hand machine, it requires at least two or three persons to run it. My machine is operated by a single person, and being very simple in its construction, the cost is very little, and it enables farmers and others greatly to economize in the labor ordinarily required in shelling corn. In the drawings—

Figure 1 shows a perspective of my corn sheller; and

Figure 2 shows a detached view of a few of the teeth, of the form and size in which I prefer to make them.

A is a plate, with a series of teeth or spikes, b, arranged in the manner shown. The whole may be cast in one piece, or the plate A may be cast separate, with holes to insert the teeth; or the plate A may be made of wood, and the teeth made of wrought iron, cast iron, steel, or other hard and suitable material inserted therein. Hard wood will answer for the teeth, but is not sufficiently durable; therefore I prefer to make them of iron or steel, either cast with the plate A or inserted in holes formed in the plate. I prefer to give the plate A the inclined position shown, by resting it on the end blocks M N on the base-board B. The base-board B should be of sufficient length to reach across the top of a tub, half bushel, barrel, or other vessel which is intended to receive the corn as it is shelled, and it may be of sufficient length to serve as a seat for the person using the sheller.

To use my machine, place it across a tub or other vessel; the operator then takes an ear of corn in the fingers of one hand, while the other hand presses the ear against the teeth b. The ear of corn is then turned by the hand holding it, and as it is turned the grains are completely rubbed or torn off the cob and fall into the vessel beneath. By a little practice any one will in a short time become very expert in shelling with my sheller. The plate A I have shown as a plane with the teeth b on its surface. But the surface of A may be a plane or a curved surface. Thus the teeth b may be arranged in a circular groove. I have shown the plate A mounted on the base-board B, but the plate A may be made of sufficient length to dispense with the blocks M N and base-board B. Instead of blocks M N, pins or standards may be inserted between the plates A B, and a simple frame may be used instead of plate B. The plate A may be perforated.

Having thus described my invention, what I claim, and desire to secure by Letters Patent, is—

The improved corn sheller herein described, composed of the plate A, with teeth b, or their equivalent, the whole arranged to operate substantially as described.

I also claim the tooth plate A, in combination with the blocks M N, and base B, or their equivalents.

ISAAC B. SIDDLE.

Witnesses:
T. C. CONNOLLY,
E. F. PRYOR.